US012248156B2

(12) United States Patent
Pickholz et al.

(10) Patent No.: US 12,248,156 B2
(45) Date of Patent: Mar. 11, 2025

(54) SILICONE LED PRESCRIPTION OPTICS FOR REGULATED LIGHTING APPLICATIONS

(71) Applicant: MagWerks Vision Inc., Oxford, MI (US)

(72) Inventors: Michael F. Pickholz, Oxford, MI (US); Steven Francis Tregilgas, Oxford, MI (US)

(73) Assignee: MagWerks Vision Inc., Oxford, MI (US)

( * ) Notice: Subject to any disclaimer, the term of this patent is extended or adjusted under 35 U.S.C. 154(b) by 0 days.

(21) Appl. No.: 18/357,645

(22) Filed: Jul. 24, 2023

(65) Prior Publication Data

US 2024/0019610 A1  Jan. 18, 2024

Related U.S. Application Data

(63) Continuation of application No. 17/365,064, filed on Jul. 1, 2021, now abandoned.

(51) Int. Cl.
| | |
|---|---|
| *G02B 3/00* | (2006.01) |
| *F21S 41/143* | (2018.01) |
| *F21S 41/26* | (2018.01) |
| *F21S 41/265* | (2018.01) |
| *F21S 41/32* | (2018.01) |
| *F21S 43/31* | (2018.01) |
| *F21S 43/40* | (2018.01) |
| *F21V 7/00* | (2006.01) |

(52) U.S. Cl.
CPC .......... *G02B 3/0031* (2013.01); *F21S 41/143* (2018.01); *F21S 41/26* (2018.01); *F21S 41/32* (2018.01); *F21S 41/322* (2018.01); *F21S 43/315* (2018.01); *F21V 7/0091* (2013.01); *G02B 3/0056* (2013.01); *F21S 41/265* (2018.01); *F21S 43/402* (2024.05)

(58) Field of Classification Search
CPC ..... F21V 7/0091; F21S 41/265; F21S 41/322; F21S 43/315; F21S 43/402
See application file for complete search history.

(56) References Cited

U.S. PATENT DOCUMENTS

| | | |
|---|---|---|
| 1,212,174 A | 1/1917 | Beiswanger |
| 1,399,973 A | 12/1921 | Limpert |

(Continued)

FOREIGN PATENT DOCUMENTS

| | | |
|---|---|---|
| CA | 738085 A | 7/1966 |
| DE | 202017104684 U1 | 1/2018 |

(Continued)

OTHER PUBLICATIONS

Machine translation of DE 102017220488 A1 retrieved from the FIT database of PE2E search. (Year: 2024).*

*Primary Examiner* — Colin J Cattanach
(74) *Attorney, Agent, or Firm* — Young Basile Hanlon & MacFarlane, P.C.

(57) ABSTRACT

A unitary silicone prescription optic has a molded silicone body comprising: a front surface configured as a light exit; an integral reflector configured to receive and reflect light from an LED light source; and an integral attachment portion configured to mount the molded silicone body within a housing. The unitary silicone prescription optic has many advantages over conventional optic systems.

14 Claims, 7 Drawing Sheets

(56) References Cited

U.S. PATENT DOCUMENTS

| | | | |
|---|---|---|---|
| 1,478,473 A | 12/1923 | Herron | |
| 2,700,098 A | 1/1955 | Brouwer | |
| 5,926,320 A | 7/1999 | Parkyn, Jr. et al. | |
| 7,118,236 B2 | 10/2006 | Hahm et al. | |
| 7,300,185 B1 | 11/2007 | Ruffin et al. | |
| 7,686,481 B1 | 3/2010 | Condon et al. | |
| 7,712,931 B1 | 5/2010 | Smith | |
| 8,215,814 B2 | 7/2012 | Marcoux | |
| 8,303,141 B2 | 11/2012 | Jiang | |
| 8,337,054 B2 | 12/2012 | Bernard | |
| 8,858,022 B2 | 10/2014 | Jiang et al. | |
| 9,409,512 B2 | 8/2016 | Stein et al. | |
| 9,423,096 B2 | 8/2016 | Wilcox et al. | |
| 9,459,436 B2 | 10/2016 | Smith | |
| 9,638,852 B2 | 5/2017 | Sakai | |
| 10,253,940 B1 | 4/2019 | Shih | |
| 10,619,817 B2 | 4/2020 | Koons et al. | |
| 10,761,243 B1 | 9/2020 | Wei | |
| 11,079,628 B2 | 8/2021 | Yamada et al. | |
| 2003/0156417 A1 | 8/2003 | Gasquet et al. | |
| 2006/0061999 A1 | 3/2006 | Sommers et al. | |
| 2006/0104077 A1 | 5/2006 | Oshio et al. | |
| 2009/0086498 A1 | 4/2009 | Condon et al. | |
| 2009/0190338 A1* | 7/2009 | Huang | F21L 4/00 362/240 |
| 2011/0249462 A1 | 10/2011 | Koizumi et al. | |
| 2013/0314925 A1 | 11/2013 | Jiang et al. | |
| 2014/0204588 A1 | 7/2014 | Ha et al. | |
| 2014/0218950 A1 | 8/2014 | Kim et al. | |
| 2015/0345747 A1 | 12/2015 | Castillo | |
| 2016/0312977 A1 | 10/2016 | Jiang et al. | |
| 2017/0321859 A1 | 11/2017 | Zawacki | |
| 2018/0017225 A1 | 1/2018 | Salter et al. | |
| 2018/0372302 A1 | 12/2018 | Orbe | |
| 2019/0017692 A1 | 1/2019 | Dinant et al. | |
| 2019/0072256 A1 | 3/2019 | Shih | |
| 2019/0128501 A1 | 5/2019 | Chen et al. | |
| 2019/0383480 A1 | 12/2019 | Williams et al. | |
| 2020/0072428 A1 | 3/2020 | Simchak et al. | |
| 2020/0080717 A1 | 3/2020 | Williams et al. | |
| 2020/0182428 A1 | 6/2020 | Antonipieri et al. | |
| 2020/0408380 A1 | 12/2020 | Muegge | |
| 2021/0053481 A1 | 2/2021 | Koerdt | |
| 2022/0034470 A1 | 2/2022 | Chen et al. | |
| 2022/0170607 A1 | 6/2022 | Mukojima | |

FOREIGN PATENT DOCUMENTS

| | | | |
|---|---|---|---|
| DE | 102017127977 A1 | 5/2018 | |
| DE | 102017220488 A1 * | 5/2018 | ............. F21S 41/00 |
| DE | 102017213100 A1 | 1/2019 | |
| FR | 2867257 A1 | 9/2005 | |
| KR | 101622734 B1 | 5/2016 | |
| WO | 2010054956 A1 | 5/2010 | |
| WO | 2015110392 A1 | 7/2015 | |
| WO | 2020021825 A1 | 1/2020 | |
| WO | 2020-109652 A1 | 6/2020 | |

* cited by examiner

SILICONE LED PRESCRIPTION OPTICS FOR REGULATED LIGHTING APPLICATIONS

CROSS-REFERENCE TO RELATED APPLICATION(S)

This application is a continuation of U.S. patent application Ser. No. 17/365,064, filed on Jul. 1, 2021, the entire disclosure of which is hereby incorporated by reference.

TECHNICAL FIELD

This disclosure relates to the field of prescription optics used in lamps utilized for illumination or signalization in regulated applications, such as vehicle headlamps, tail lamps and signal lamps. The prescription optics are made from optical silicone to be used with LEDs, and are unitary structures incorporating the lens and total internal reflector (TIR).

BACKGROUND

Optical lenses engineered to harness and direct sources of light are produced with basic techniques devised to tailor light output. Since the 1980's, plastic lenses have steadily replaced glass as the transparent outer enclosure for lighting applications in most fields and metal or plastic is used for the reflectors. Historically, plastic lenses have been produced from rigid materials, such as, but not limited to, polycarbonate (PC), poly(methyl methacrylate) (PMMA), polystyrene (PS), cyclic olefin polymer (COP), cyclic olefin copolymer(COCP).

These materials are essentially rigid in nature, not substantially deforming under applied pressure or through the force of gravity. Once properly fixed and in place, such materials essentially retain their geometric configuration. However, there are many disadvantages to the use of plastic for optical lenses, particularly in the automotive field. Furthermore, separate components (e.g., lens and reflector) can lead to additional disadvantages and low efficiency. There is an ever-growing need for weather-proof, light-weight lamps for electric and autonomous vehicles that can meet the different prescription requirements of the various applications while also meeting mandated specifications.

SUMMARY

Disclosed herein are embodiments of unitary silicone prescription optics. One example of a unitary silicone prescription optic as disclosed herein has a molded silicone body comprising: a front surface configured as a light exit; an integral reflector configured to receive and reflect light from an LED light source; and an integral attachment portion configured to mount the molded silicone body within a housing.

Also disclosed herein are lamps, such as for vehicles. One example of a lamp has a unitary molded body molded from silicone comprising: a front surface configured as a light exit; an integral reflector molded to meet a prescription light output; and an integral attachment portion. The lamp also includes an LED light source, the integral reflector receiving and reflecting light from the LED light source, and a housing configured to mount the unitary molded body within a structure, the integral attachment portion attached directly to the housing without an additional seal member.

Another example of a lamp with a single-stage optic has a unitary molded body molded from silicone comprising: a front surface configured as a light exit; an integral reflector molded to meet a prescription light output; and an integral attachment portion. The lamp further has a light source and a housing configured to mount the unitary molded body to a structure.

The unitary silicone prescription optics disclosed herein provide a single lens optic with integrally molded reflector, the optic molded from silicone and capable of complex prescriptions that meet the regulatory requirements for regulated lighting applications. The unitary silicone prescription optics provide a much lighter lamp beneficial to all vehicles, and particularly autonomous vehicles and electric vehicles. Because the optic is a single component, the optics can reach 85% efficiency, a significant increase over conventional lamps, which lose about 10% efficiency for each component through which light passes. The optic can obtain greater than 55% efficiency, greater than 75% efficiency, up to 85% efficiency and more depending on the prescription. The unitary silicone prescription optics can be used with LEDs as the silicone has a higher temperature resistance than conventional plastic lenses. The disclosed prescription optics are used without any coatings or outer lenses, as the silicone is impervious to UV damage and damage from road debris impingement. The prescription optics disclosed herein can be mounted directly into the vehicle lamp housing, without the need for additional sealant or gaskets, as the silicone acts as a seal, protecting the optic from weather related issues such as fogging, condensation and frost. Because the optic is one piece, there is no alignment necessary between components when installed in the application.

These and other embodiments and aspects are contemplated herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Conventional automotive lamps incorporate a light source, which may include a circuit board, a primary optic system, which can comprise a reflector and a separate lens, for example, and a secondary optic, which includes an outer lens, the components held in a housing. Additional lenses may also be included in the primary optic, such as a collimating lens, in certain applications, such as fog lamps. Reflectors are typically made of various plastics, via plastic injection molding, metal castings or stamped metal construction. Outer lenses of the secondary optic were typically glass, but have evolved to plastics, such as PC, PMMA, PS, COP and COCP, as examples. Where glass is weather and UV resistant, plastics are generally not. Thus, plastic outer lenses typically require a UV coating to protect against deterioration from sunlight, as well as a hard coating to protect against damage from impinging road debris. To further protect the lamp from weather, gaskets and/or sealants are necessary to properly seal the lamp at least between the outer lens and the housing.

These conventional lamps require the multi-stage optics to properly collect, then shape the light into the desired illumination pattern. As light passes through multiple components, efficiency is lost. On average, about 10% efficiency is lost with each component. Current automotive lamp efficiency is around 40%.

Disclosed herein are embodiments of a single-stage optic used with a light source and a housing to provide a lamp that is lightweight, has fewer components, is water-tight and UV resistant, among other benefits. The unitary silicone prescription optics disclosed herein have a molded silicone body comprising: a front surface configured as a light exit; an integral reflector configured to receive and reflect light from an LED light source; and integral attachment portions configured to mount within a housing. As used herein "prescription" refers to an optic or a lens that is designed to meet certain specification with regard to light or radiation pattern and intensity.

The unitary silicone prescription optics disclosed herein will be understood by those skilled in the art to have utility in numerous, various applications, including those applications having regulated specifications and those that do not. Applications having regulated specifications, for which the disclosed optics are particularly suited, include, without limitation, electric and motor vehicles (including automobiles, trucks, aircraft, watercraft, recreational vehicles, off-road vehicles, and the like), aerospace, and other lighting. Vehicle applications include, but are not limited to, headlamps, turn signal lamps, low beam lamps, high beam lamps, signal lamps, side lighting lamps, auxiliary lamps, tail lamps and fog lamps. The term "exterior vehicle lamp" used herein generally refers to those listed as well as others known and used in the industry.

Optical silicone provides many advantages over the rigid plastic typically used in lenses. Common headlamp plastic lenses require the application of external anti-UV coatings in order to preclude the degradation of the plastic, which otherwise rapidly turns opaque, greatly reducing the functional performance as well as adversely impacting the appearance of the product. Such products commonly have a limited performance lifespan, leading to often severe optical degradation with extended sunlight (UV) exposure, a clear negative for products frequently or continually exposed to sun. Optical silicone is impervious to UV radiation damage. Optical silicone testing has demonstrated resistance to UV damage in excess of 10 years in direct sun exposure. No anti-UV coating is needed with optical silicone.

Conventional plastic lenses, particularly those used on vehicle headlamps, require hard coatings in order to mitigate the rapid surface degradation brought about by foreign object impingement, occurring, for example, during travel. Optical silicone has an inherent resistance to gravel and other road debris impingement. The soft, rubber-like properties of optical silicone are such that, rather than imbedding and/or damaging the surface of the plastic lenses, the energy is absorbed within the optical silicone without adversely affecting the optical clarity of the material, with the debris simply bouncing-off without imparting physical damage to the optic silicone material.

Plastics used to make lenses shrink while cooling, which leads to the loss of critical optical shape definition as the material pulls away from the desired tool optical geometry. This can be particularly pronounced in large molds, with large optical lens volumes leading to undesirable deformations in other critical optic areas. The industry has sought to address such issues via multi-step molding solutions, whereby lenses are produced via successive molding "steps" thereby accumulating material in subsequent molding operations so as to control shrink and thereby deliver accurate as-molded optical performance. Such processes are inherently expensive, given the multi-shot nature of the molding equipment.

Optical silicone can be molded/formed accurately in a large format optic with no sink or other optical aberrations and in a single mold process. Optical silicone optics are formed with a thermoset process, which utilizes a catalyst along with heat input to cure the optic into its final configuration. Rather than shrink, silicone effectively expands during the molding process, thereby enabling a highly accurate replication of the optical surface, in a single molding step. Optical silicone is rubber-like in nature. The flexibility of optical silicone provides the ability to incorporate flexible elements, the ability to incorporate significant "undercuts", which otherwise would prevent plastics to be removed from the mold without incorporating mold action, and the ability to significantly deform yet return to its as-molded shape.

Yet another advantage of using optical silicone is its significantly higher temperature resistance than other common optical-grade plastics, which make optical silicone particularly useful in LED applications where close proximity between the optical element and the LED source is functionally advantageous. Such close proximity between LEDs and conventional plastic lenses is often precluded due to the thermal degradation brought about by high temperatures on plastic optics, for instance. Conventional clear plastics are only temperature resistant up to around 100° C. For example, PC is temperature resistant to about 120° C. and PMMA is temperature resistant up to about 90° C. Silicones are usually rated to remain thermally stable to temperatures in the area of 200° C., which is nearly double that of traditional optical grade plastics. Silicone optics can thus be placed near or directly over high temperature LED sources, thereby significantly improving optical performance while precluding damage over time, a critical functional advantage.

The ability to combine the outer lens, some or all of any additional lenses, and the reflector into a unitary body, providing full optical management, also provides many advantages.

Figure 1A:
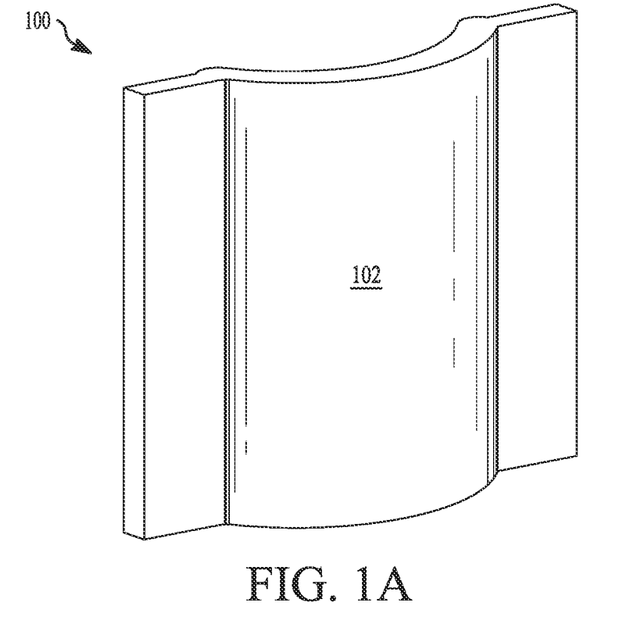
FIG. 1A is a front perspective view of a unitary silicone prescription optic as disclosed herein.
Figure 1B:
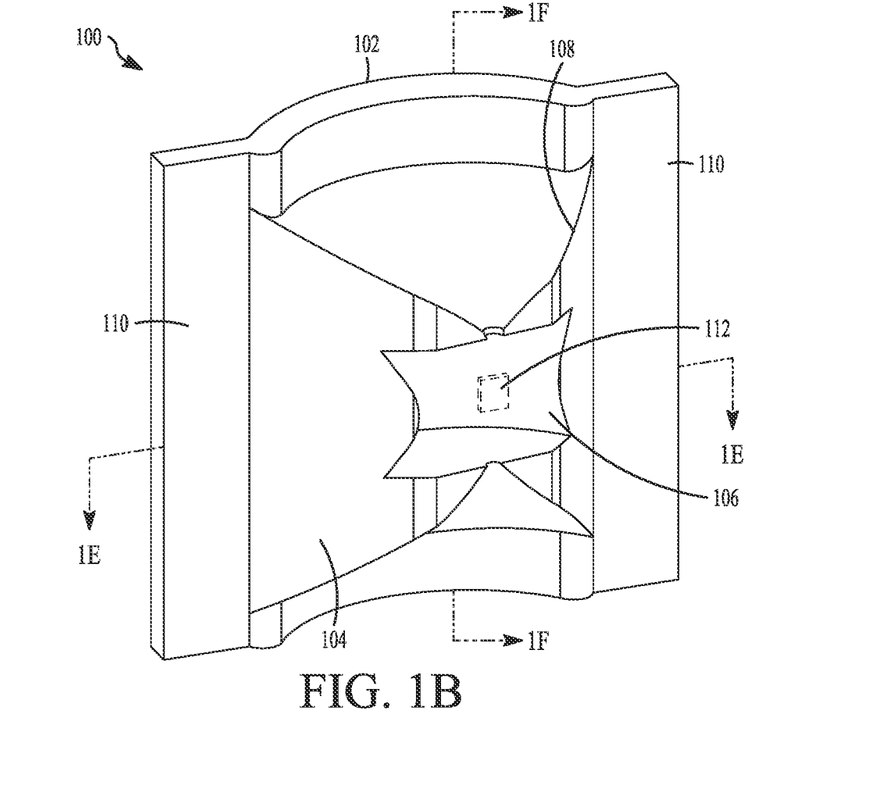
FIG. 1B is a rear perspective view of the unitary silicone prescription optic in FIG. 1A.
Figure 1C:
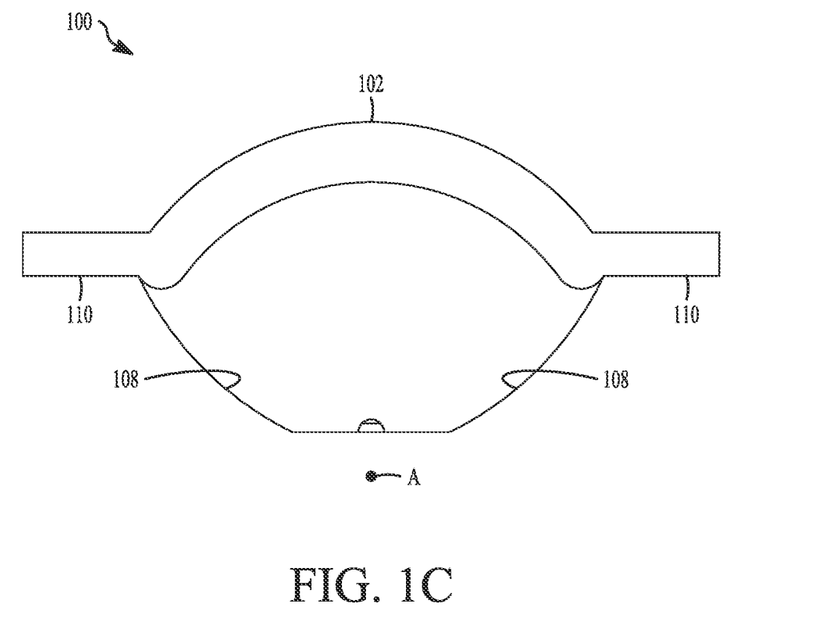
FIG. 1C is a top plan view of the unitary silicone prescription optic in FIG. 1A.
Figure 2:
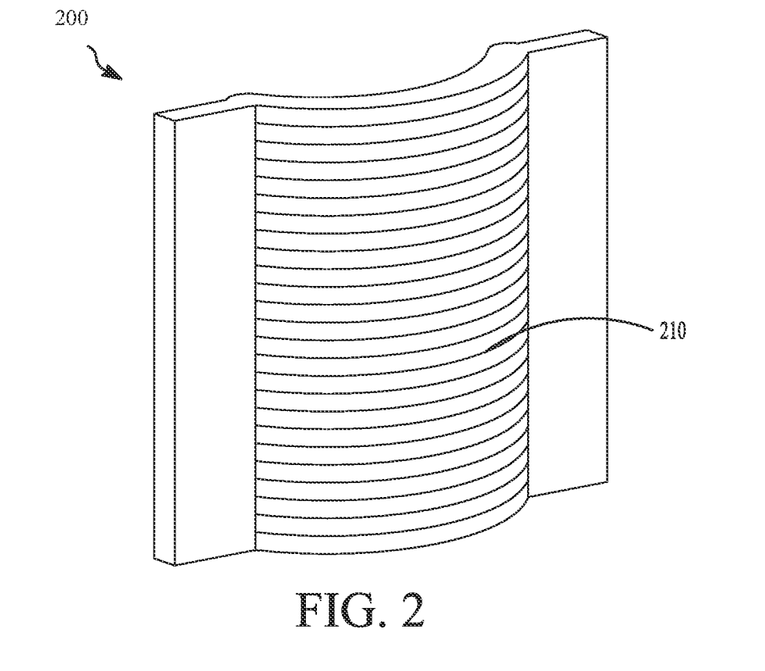
FIG. 2 is a front perspective view of another aspect of a unitary silicone prescription optic as disclosed herein.

FIG. 1A is a front perspective view of an embodiment of a single-stage optic (one lens) for a lamp, or a monolith silicone prescription optic 100, and FIG. 1B is a rear perspective view of FIG. 1A. The front surface 102 is an exit surface through which light exits the optic. The front surface 102 can be smooth or can have vertical or horizontal flutes, such as the horizontal flutes 210 illustrated with the unitary silicone prescription optic of FIG. 2. The front surface 102 may have pillows, or other contours that are necessary to provide the requisite light pattern and/or intensity. The flutes or pillows are molded into the front surface 102 as the prescription optic 100 is molded. The front surface 102 is designed to meet the prescription and specifications for which it will be used. The front surface 102 is coating-free in use. No coating for UV protection or damage protection is required as the silicone material is UV resistant and impervious to damage from impinging debris.

Figure 1D:
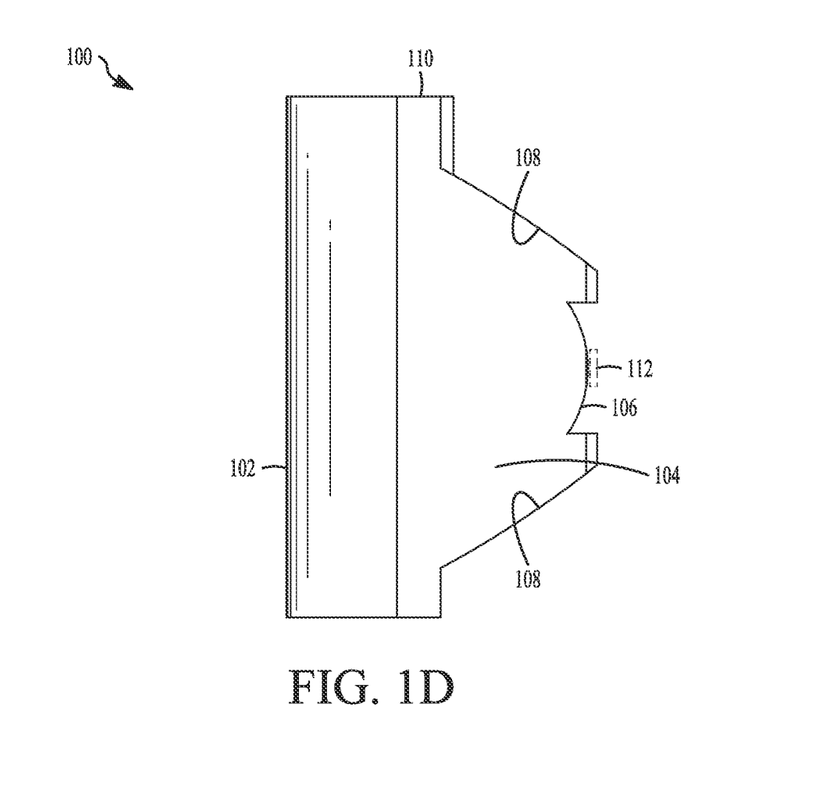
FIG. 1D is a right-side view of the unitary silicone prescription optic in FIG. 1A.
Figure 1E:
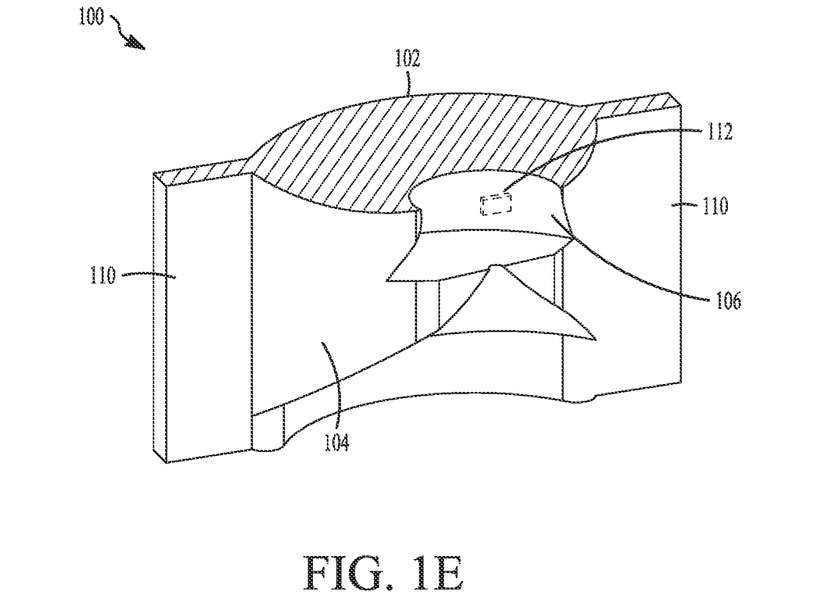
FIG. 1E is a rear perspective view of a cross-sectional view of the unitary silicone prescription optic in FIG. 1A along line E.
Figure 1F:
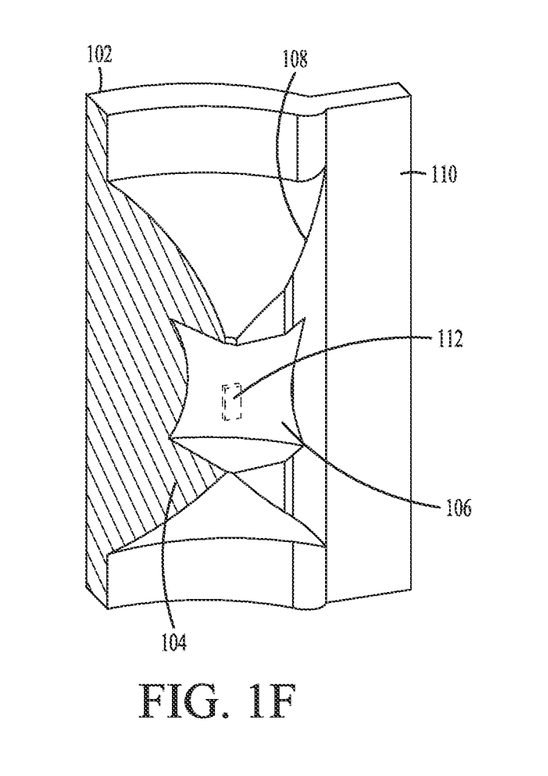
FIG. 1F is a rear perspective view of a cross-sectional view of the unitary silicone prescription optic in FIG. 1A along line F.
Figure 1G:
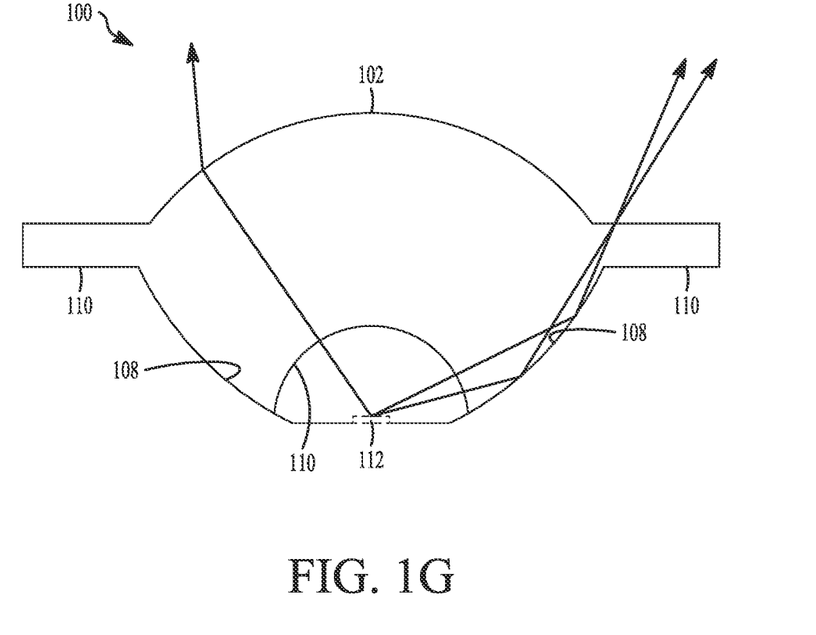
FIG. 1G is a top plan view of the unitary silicone prescription optic in FIG. 1E.
Figure 1H:
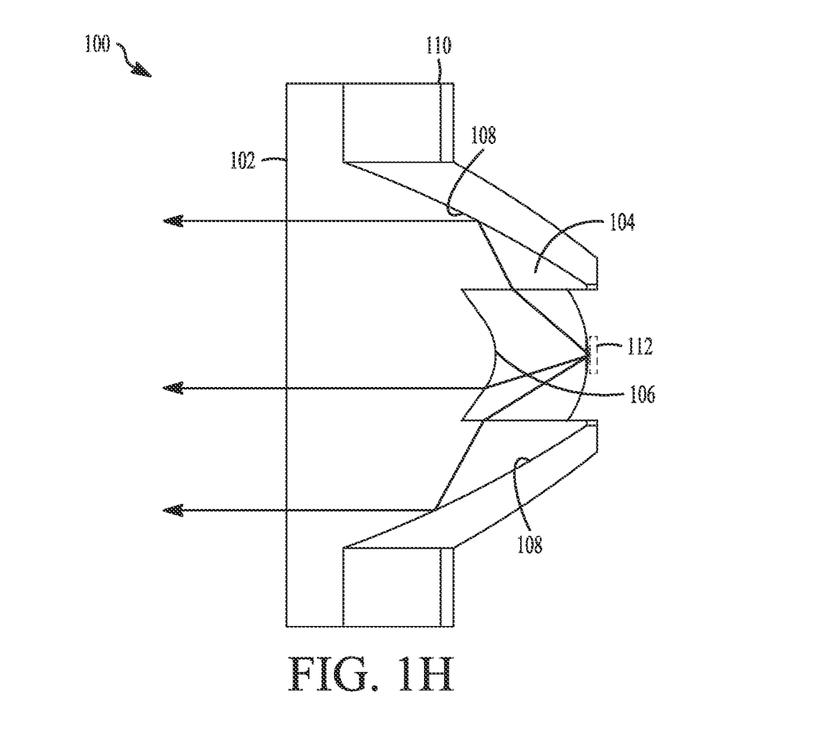
FIG. 1H is a right-side view of the unitary silicone prescription optic in FIG. 1F.

As seen in FIG. 1B, the reflector 104 is integrally molded with the front surface 102. The reflector 104 is configured to receive and reflect light from an LED light source 112, shown in broken line. The reflector 104 will have one or more light receiving surfaces 106 which are reflective surfaces formed around a vertical axis. The reflector 104 also has four light reflecting surfaces 108. FIG. 1D is a side view of the unitary silicone prescription optic 100. FIG. 1E is a perspective view of a cross-section of FIG. 1B along line E, and FIG. 1F is a perspective view of another cross-section of FIG. 1B along line F. FIG. 1G is a top plan view of FIG. 1E, and FIG. 1H is a right-side view of FIG. 1F when viewing from the front. Together FIGS. 1G and 1H illustrate the four light reflecting surfaces 108. The four light reflecting surfaces 108, providing four total internal reflection (TIR) faces, gather the light, making up to 85% efficiency possible while providing sharpness and pattern control. The reflector 104 is shaped depending on the prescription, application and specifications. The reflector illustrated herein is provided as an example and is not meant to be limiting.

The unitary silicone prescription optic 100 also has integral attachment portions 110 that will hold the unitary silicone prescription optic 100 in a housing. Due to the rubber-like, flexible nature of the optical silicone, the unitary silicone prescription optic 100 is its own sealing gasket to sealing contact the housing. Conventional rigid plastic requires the use of a gasket and/or sealant between the lens and the housing to seal the interior against moisture, for example, from rain, snow and humidity, which can ice over the internal of the lamp, fog the interior of the lens or otherwise form condensation on the interior of the lens. Such a gasket or other additional sealing member is not needed as the contact between the housing and the unitary silicone prescription optic 100 is such that it seals against weather without the need for a gasket or other additional sealing member. To affect the water-tight contact between the silicone optic and the housing, a simple adhesive or mechanical retention to create uniform, tight contact, can be used.

The rubber-like flexibility of optical silicone renders thin lenses, or thin areas of lenses, prone to deformation due to external forces such as gravity, external mechanical pressure, aerodynamic pressure, vibrations, etc. Although the integral combination of the lens and the reflector in the disclosed unitary prescription optics will generally result in a structure with that is sufficiently thick, and therefore not impacted by the rubber-like flexibility with regard to deformation, some portions of the disclosed unitary prescription optics may be thin enough to be impacted. Accordingly, internal reinforcement in the thin portions may be desirable.

Figure 3:
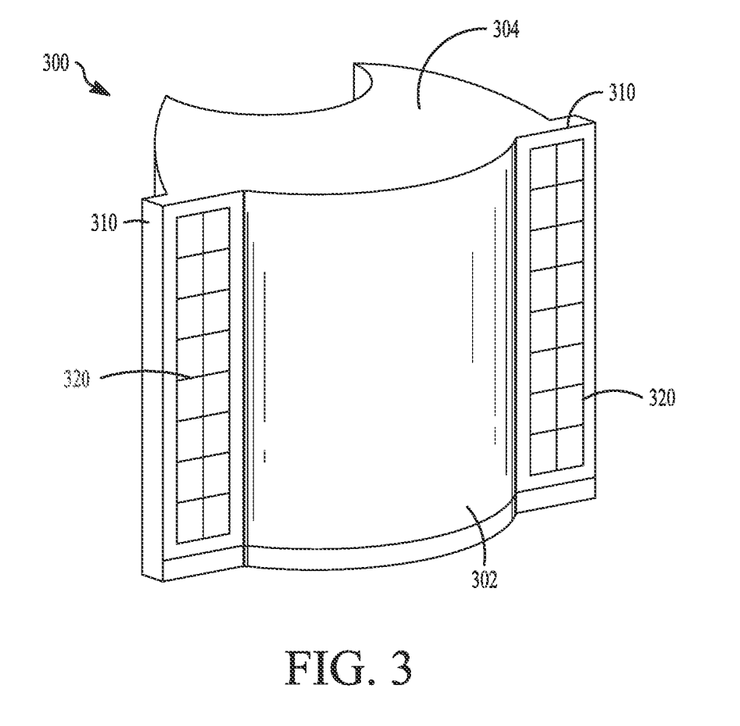
FIG. 3 is a front perspective view of yet another aspect of a unitary silicone prescription optic as disclosed herein.

FIG. 3 illustrates another aspect of a unitary silicone prescription optic 300. As illustrated, the unitary optic 300 is thicker where the lens, or front surface 302, and the reflector 304 are molded and are thinner at the attachment portions 310. To provide structural mechanical strength to the attachment portions 310, a reinforcing structure 320, such as a reinforcing grid, is molded within and fully captured in the silicone material of the attachment portions 310. The unitary prescription optic 300 is internally reinforced at the attachment portions 310 by the suitable mechanically strong reinforcing structure 320, as well as the thickness of the remainder of the optic. The reinforcing structures 320 can be of any design that provides sufficient structural support to the optic and may be selected based on aesthetics or other reasons. The reinforcing structure 320 may be constructed from a variety of known materials, such as, but not limited to, thin wires, molded plastics, cast or molded metals, metal stampings and the like.

Figure 4A:
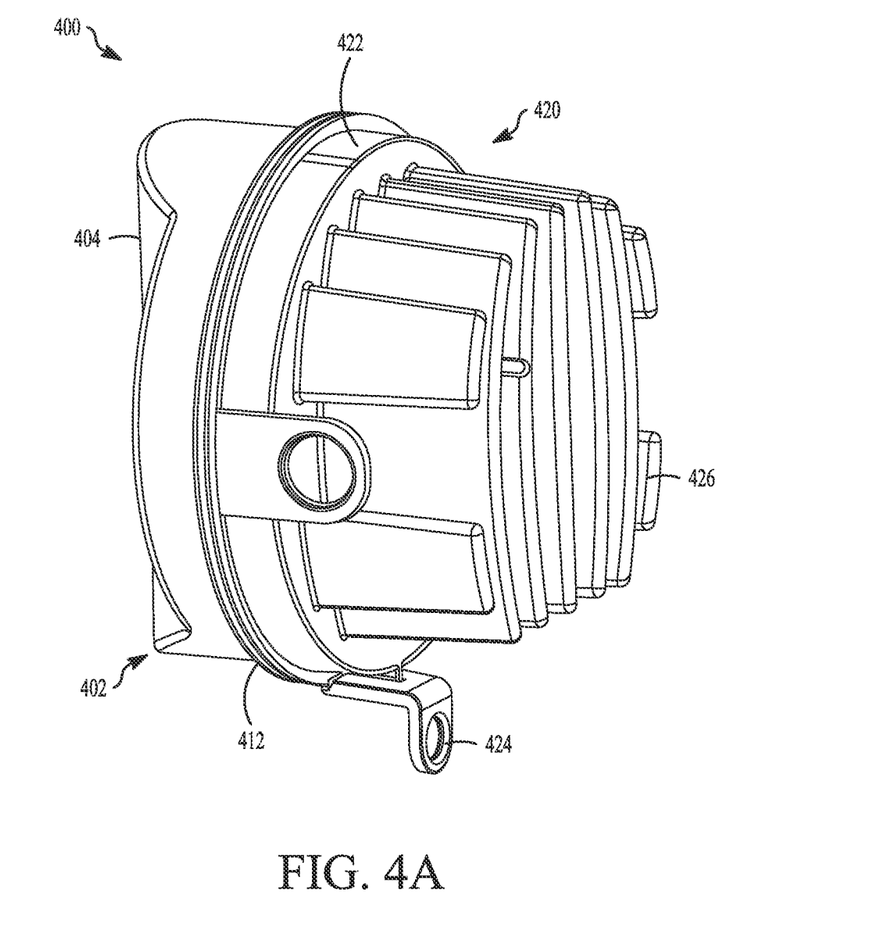
FIG. 4A is a perspective view of a lamp with a single-stage optic as disclosed herein.
Figure 4B:
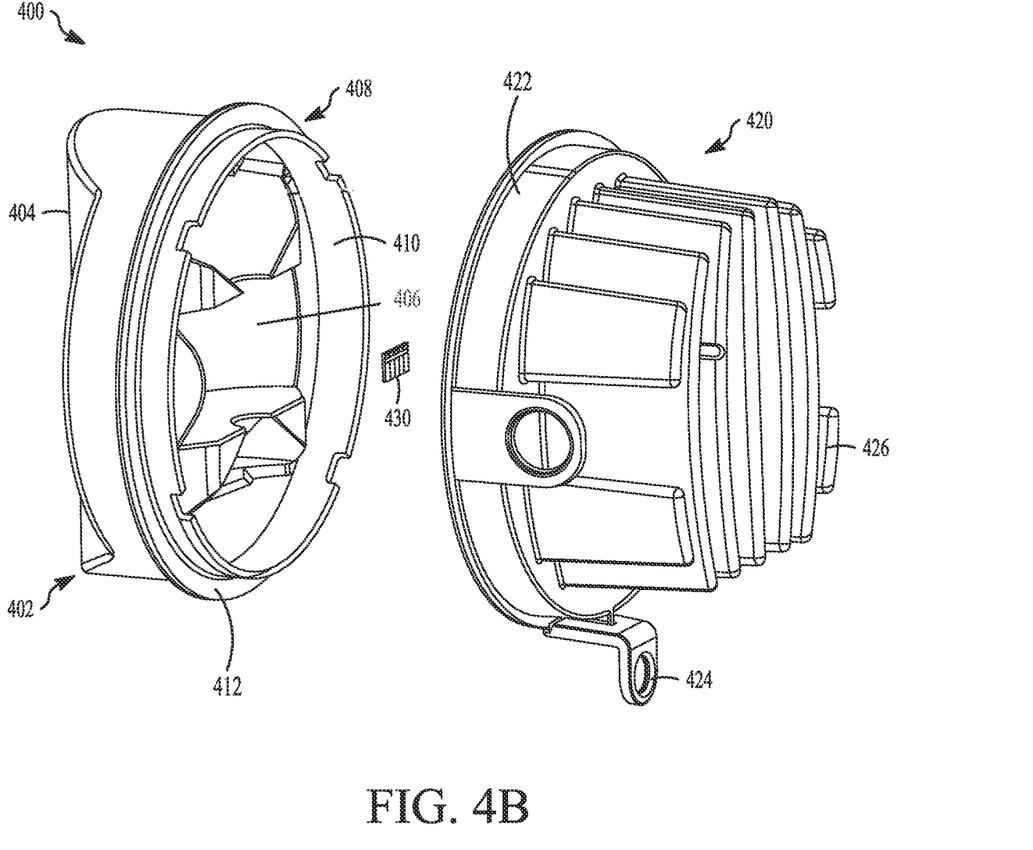
FIG. 4B is an exploded view of the lamp of FIG. 4A.

Also disclosed herein are lamps having a single-stage optic, such as for vehicles. One example of a lamp for a vehicle with a single-stage optic is illustrated in FIGS. 4A and 4B, with FIG. 4B being an exploded view of FIG. 4A. The lamp 400 has a unitary molded body 402 molded from silicone. The unitary molded body 402 has a round cross-section and is different from those depicted in the other drawings as a means of providing an example of a different shape and prescription. It is to be noted that the unitary molded body can have any cross-sectional shape as required by the design of the lamp such that it engages the housing. The unitary front surface and reflector can be of differing designs depending on the prescription. In FIG. 4, the unitary molded body has a front surface 404 configured as a light exit, an integral reflector 406 molded to meet a prescription light output, and an integral attachment portion 408. As shown, the attachment portion 408 has a first attachment member 410 and a second attachment member 412. The attachment portion 408 can be of any configuration that provides the requisite attachment to the housing, creating a water-tight seal without the need for an additional sealing member such as a gasket. The attachment portion 408 in FIG. 4 includes the first attachment member 410 to fit within a housing 420 and the second attachment member 412, contacting the housing in a flange-like capacity. Either or both of the first attachment member 410 or the second attachment member 412 can include a reinforcing structure as previously described.

The lamp 400 also includes an LED light source 430, the integral reflector receiving and reflecting light from the LED light source 430. The LED light source is not limited and can be one or more LEDs and can include a circuit board and/or other means of powering and controlling the LED(s). A housing 420 is configured to sealingly engage the unitary molded body 402 as well as mount the unitary molded body 402 within a vehicle exterior, the integral attachment portion 408 attached directly to the housing 420 without an additional seal member. The housing 420 includes a single stage lens attachment 422 configured to attached to the unitary molded body 402, attachment members 424 to attach the lamp 400 to a vehicle or other lighting application, and, optionally, a heat sink 426. The hit sink 426 may also or alternatively be provided at the LED light source.

The unitary silicone prescription optics disclosed herein provide a single-stage optic with integrally molded reflector, the optic molded from silicone and capable of complex prescriptions that meet the regulatory requirements for regulated lighting applications. The unitary silicone prescription optics provide a much lighter lamp beneficial to all vehicles, and particularly autonomous vehicles and electric vehicles. Because the optic is a single component, the optics can reach 85% efficiency, a significant increase over conventional lamps, which lose about 10% efficiency for each component through which light passes. The optic can obtain greater than 55% efficiency, greater than 75% efficiency, up to 85% efficiency and more depending on the prescription. The unitary silicone prescription optics can be used with LEDs as the silicone has a higher temperature resistance than conventional plastic lenses. The disclosed prescription optics are used without any coatings or outer lenses, as the silicone is impervious to US damage and damage from road debris impingement. The prescription optics disclosed herein can be mounted directly into the vehicle lamp housing, without the need for an additional member such as a gasket, as the silicone acts as a seal, protecting the optic from weather related issues such as fogging, condensation and frost. An adhesive or mechanical retention may be used to obtain a uniform, tight fit between the housing and the optic. Because the optic is one piece, there is no alignment necessary between components when installed in the application.

These and other advantages can be realized with the unitary silicone prescription optics disclosed herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A prescription lamp for a vehicle, comprising:
   a unitary molded silicone body, comprising:
      a front surface configured as a light exit;
      an integral reflector configured to receive and reflect light from an LED light source;
      an integral attachment portion configured to mount the unitary molded silicone body, the integral attachment portion extending from at least a portion of a perimeter of the front surface and having a thickness that is less than a thickness of the front surface and integral reflector together; and
      a reinforcing structure embedded within silicone of the integral attachment portion to limit flexibility of the silicone of the integral attachment portion.

2. The prescription lamp of claim 1, wherein the front surface of the molded silicone body is a refractive face with a molded contour to produce a requisite light spread and light intensity.

3. The prescription lamp of claim 1, wherein the front surface of the molded silicone body includes horizontal or vertical flutes or pillows.

4. The prescription lamp of claim 1, wherein the integral attachment portion extends from an entire perimeter of the front surface.

5. The prescription lamp of claim 4, wherein the integral attachment portion extends perpendicular to the front surface.

6. The prescription lamp of claim 1, wherein the integral attachment portion comprises a first attachment portion extending from the perimeter of one side of the front surface and a second attachment portion extending from the perimeter of an opposite side of the front surface, the first attachment portion and the second attachment portion extending generally parallel with the front surface.

7. The prescription lamp of claim 6, wherein the reinforcing structure is rigid metal that imparts structural strength to silicone forming the integral attachment portion.

8. The prescription lamp of claim 1, wherein the integral attachment portion is configured to mount the unitary silicone body to a vehicle structure.

9. A prescription lamp having a single lens, comprising: a unitary molded body molded from silicone, the unitary molded body being an integral reflector molded to meet a prescription light output, the integral reflector having a front surface configured as a light exit and an integral attachment portion extending from at least a portion of a perimeter of the integral reflector; an LED light source; and a housing configured to mount the unitary molded body to a structure, the integral attachment portion attached directly to the housing, wherein the attachment portion comprises a reinforcing structure of reinforcing material different than silicone, the reinforcing structure embedded only within the attachment portion and imparting structural strength to the attachment portion.

10. The prescription lamp of claim 9, wherein the housing carries one or more of the LED light source, a circuit board, and a heat sink.

11. The prescription lamp of claim 9, wherein the structure is a vehicle and the prescription light output is for an exterior head lamp or tail lamp.

12. The prescription lamp of claim 9, wherein the front surface of the unitary molded body is a refractive face with a molded contour to produce a requisite light spread and light intensity.

13. The prescription lamp of claim 9, wherein the front surface of the unitary molded body includes horizontal or vertical flutes or pillows.

14. The prescription lamp of claim 9, wherein the front surface is coating-free.

* * * * *